United States Patent [19]
Rudolph et al.

[11] 3,989,655
[45] Nov. 2, 1976

[54] LOW SHRINK, FREE FLOWING POLYESTER RESIN SYSTEMS BASED ON A MIXTURE OF A CRYSTALLINE UNSATURATED POLYESTER RESIN, A MONOMERIC COPOLYMERIZABLE COMPONENT AND A CELLULOSE ESTER

[75] Inventors: Hans Rudolph; August Böckmann, both of Krefeld; Leonhard Goerden, Grefrath; Oskar Walter, Krefeld; HansJochen Schulz-Walz, Meerbusch, all of Germany

[73] Assignee: Bayer Aktiengesellschaft, Germany

[22] Filed: Jan. 17, 1974

[21] Appl. No.: 434,012

Related U.S. Application Data

[63] Continuation-in-part of Ser. No. 377,551, July 9, 1973, abandoned.

[30] Foreign Application Priority Data

Nov. 2, 1973  Germany............................ 2354716

[52] U.S. Cl............................. 260/16; 260/857 PE; 260/860; 260/861; 260/862
[51] Int. Cl.²............................................ C08L 1/14
[58] Field of Search ............. 260/16, 862, 860, 861, 260/857 EP

[56] References Cited
UNITED STATES PATENTS

| | | | |
|---|---|---|---|
| 3,642,672 | 2/1972 | Kroekel | 260/16 |
| 3,711,432 | 1/1973 | Shah | 260/16 |

FOREIGN PATENTS OR APPLICATIONS

| | | | |
|---|---|---|---|
| 644,287 | 10/1950 | United Kingdom | 260/861 |
| 936,351 | 9/1963 | United Kingdom | 260/862 |
| 1,276,198 | 6/1972 | United Kingdom | 260/9 |

OTHER PUBLICATIONS

"Low Profile System in USA and Europe," Kloker et al., Bayer–Chemiewerkstoff, 1970.

*Primary Examiner*—Edward M. Woodberry
*Attorney, Agent, or Firm*—Connolly and Hutz

[57] ABSTRACT

A composition comprising
a. 24–70% by weight of an unsaturated crystalline polyester which is the condensation product of fumaric acid and a glycol of the formula

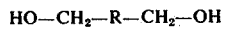

$$HO-CH_2-R-CH_2-OH$$

wherein R is of the formula $(CH_2)_z$ wherein z is 1 to 18 or a symmetrical dialkyl derivative of $(CH_2)_z$ wherein the alkyl substituents are situated on the same carbon atom or cycloalkylene,
b. 20–70% by weight of styrene and
c. 1–30% by weight of at least one member selected from the group consisting of a polycarbonate, polyamide, polyvinyl alcohol, polyvinyl alcohol acetal, polyvinylchloride, cellulose ester of at least one organic acid and polyethylene. Said mixture may additionally contain one or more fibrous reinforcing agents and one or more fillers.

5 Claims, No Drawings

LOW SHRINK, FREE FLOWING POLYESTER RESIN SYSTEMS BASED ON A MIXTURE OF A CRYSTALLINE UNSATURATED POLYESTER RESIN, A MONOMERIC COPOLYMERIZABLE COMPONENT AND A CELLULOSE ESTER

CROSS-REFERENCE TO RELATED APPLICATION

This application is a continuation-in-part of our application Ser. No. 377,551, filed July 9, 1973, now abandoned.

This invention relates to free-flowing moulding compositions capable of hardening with low shrinkage and based on unsaturated polyesters, which can be produced without the usual metal oxide or metal hydroxide thickeners and which are suitable in this form for injection moulding.

Conventional polyester moulding compositions show considerable polymerisation shrinkage, which means that the production of mouldings with faultless surface qualities is seriously affected. It is known from numerous publications (German Offenlegungsschrifts Nos. 1,192,820; 1,694,857; 1,803,345; 1,953,062; 2,051,663 and 2,061,585, and French Patent Specification No. 1,148,285) that polyester moulding compositions, to which certain thermoplasts such as, for example, polystyrene, polyethylene or poly(meth)acrylate are added before hardening, can be hardened with low shrinkage.

The aforementioned publications relate both to liquid cast resins and also to resins thickened by fillers which, on account of their tackiness, are naturally unsuitable for the production of free-flowing polyester moulding compositions unless further auxiliaries are added. These tacky resins can only be processed into free-flowing compositions by adding such large quantities of fillers that the resulting polyester moulding compositions can no longer be processed in injection-moulding machines and their mechanical properties no longer satisfy practical requirements.

Accordingly, an object of the invention is to provide free-flowing unsaturated polyester moulding compositions hardening with low shrinkage which can be prepared without thickeners or fillers and which are suitable in this form for injection moulding.

Surprisingly, it has now been found that with a combination of a special selection of thermoplasts and one of the unsaturated crystalline polyesters known from British Patent No. 644,287 whose complete specification was published on Oct. 11, 1950 it is possible to produce free flowing compositions. We have found that polycarbonates, polyamides, polyvinyl alcohol, polyvinyl alcohol acetals, polyvinyl chloride and, preferably, cellulose esters of organic acids and polyethylene are suitable thermoplasts in a combination of this kind. With these thermoplasts, not only is it possible to process unsaturated polyester-styrene mixture according to said British Patent with the usual styrene contents of from about 20 to 40% by weight into free-flowing moulding compositions which can be hardened with low shrinkage, but it is also possible to add considerably more styrene to mixtures of this kind without any adverse effect upon crystallinity. Said British Patent relates to a process for the production of unsaturated, crystalline polyesters according to which fumaric acid is reacted with a glycol of the formula HO—CH$_2$—R—CH$_2$—OH, wherein R represents an alkylene of the formula $(CH_2)_z$ where $z = 1 - 18$, or symmetrical dialkyl derivatives of the alkylene radical $(CH_2)_z$, the alkyl radicals being situated on the same carbon atom, or a cycloalkylene radical, said reaction being carried out at an elevated temperature until a product is obtained with an acid number smaller than 100.

Accordingly, the invention provides free-flowing injection-moulding compositions polymerising with low shrinkage, based on ethylenically unsaturated polyesters, copolymerisable monomers and thermoplasts, which are characterised by the following composition:

a. 24 – 70% by weight of an unsaturated crystalline polyester which contains fumaric acid residues and residues of glycols corresponding to the general formula HO—CH$_2$—R—CH$_2$—OH, in which R represents an alkylene radical of the formula $(CH_2)_z$ where $z = 1 - 18$, or symmetrical dialkyl derivatives of the alkylene radical $(CH_2)_z$, the alkyl substituents being situated on the same carbon atom, or a cycloalkylene radical;

b. 20 – 75% by weight of styrene; and c. 1 – 30% by weight of a polycarbonate, polyamide, polyvinyl alcohol, polyvinyl alcohol acetal, polyvinyl chloride or, preferably, cellulose ester of organic acids or polyethylene, alone or in admixture.

Any unsaturated crystalline polyesters can be used as component a). It is not absolutely essential for the purpose of the invention to use fumaric acid as a starting material in the preparation of the unsaturated polyesters. It can also be formed by rearrangement from maleic acid during preparation of the unsaturated polyester. Particularly preferred diols are neopentyl glycol, 1,4hydroxymethylcyclohexane and 1,6-hexane diol.

Like the thermoplasts, the polyesters can be used either individually or in admixture with one another.

Preferred polycarbonates are products having molecular weights in excess of 15,000 based on bisphenol A, or chlorinated, brominated or methyl-substituted bisphenol A, such as for example, tetrachloro-bisphenol A, tetrabromobisphenol A or tetramethyl-bisphenol A, in the form of homocondensates or co-condensates.

Suitable polyamides include any of the common and in many cases, also commercially available products having a molecular weight in excess of 10,000, based on amino carboxylic acids such as, for example, 6-amino caproic acid or 11-amino undecane carboxylic acid, their lactams with at least 5 methylene groups such as, for example, caprolactam or lauriclactam, diamines or dicarboxylic acids, each with at least 4 methylene groups such as, for example, hexamethylene diamine, adipic acid or sebacic acid.

Fully hydrolysed and, with equal advantage, only partially hydrolysed polyvinyl acetates having molecular weights in excess of 15,000 and residual acyl contents of from 0.1 to 30%, can be used as the polyvinyl alcohols.

Suitable polyvinyl alcohol acetals are, preferably, polyvinyl alcohols acetalised to around 80% with formaldehyde or butyraldehyde, having residual acyl contents of 2% and molecular weights in excess of 15,000.

Suitable polyvinyl chlorides include any of the products currently obtainable by emulsion, suspension or bulk polymerisation and having molecular weights in excess of 15,000. Copolymers produced from vinyl chloride and up to 25% by weight of vinylacetate, vinylidene chloride, acrylic or maleic acid esters, are also suitable for use as the thermoplastic component (c).

The polyethylene used in accordance with the invention can be any known type of polyethylene having a molecular weight in excess of 5,000, especially polyethylenes copolymerised with up to 10% by weight of vinylacetate.

As cellulose esters there are preferably used the esterification products of cellulose with organic acids having 2 to 4 C atoms, such as acetic acid, propionic acid, butyric acid. Examples of these are: cellulose acetals, cellulose acetate propionates, cellulose acetate butyrates.

The resin mixture according to the invention is hardened under heat and pressure, in the presence of known initiators, such as peroxides, for example benzoyl peroxide, tert.-butyl perbenzoate, cyclohexanone peroxide. The compositions are, of course, suitable not only for injection moulding, but also for compression moulding.

Other additives, such as, for example, mould-release agents and lubricants, stabilisers, pigments, fillers, and/or optionally glass fibres, can be added in an efficient amount in a conventional manner to the free-flowing polyester moulding compositions according to the invention, with polymerise with low shrinkage. Instead of using glass fibres, it is possible to use fully or partly synthetic fibres, or natural organic fibres such as jute, sisal, cotton, or mineral fibres, such as asbestos.

A further important subject of the present invention are free-flowing unsaturated polyester moulding compositions hardening with low shrinkage which contain up to 80% by weight of inorganic fillers such as chalk, dolomite, kaolin, talcum, silicates, alumina, barite, quartz and/or asbestos, preferably when comminuted in a mill.

The free-flowing polymerising compositions can be advantageously used for applications where high dimensional stability is required, for example in the motor-car industry, in the furniture industry, in the manufacture of shells and other shaped structures.

The invention is illustrated by the following Examples:

A. Production of free flowing polyester compositions without fillers and reinforcing agents

EXAMPLE 1

1.000 mol of fumaric acid and 0.982 mol of neopentyl glycol are condensed for 24 hours at 190° C in the presence of 0.037 g of tolylene hydroquinone up to an acid number of 40. A further 0.019 g of tolylene hydroquinone and 0.016 g of chloranil are then added to the polyester.

54.5 g of a powdered polycarbonate based on bisphenol A (Bayer's Makrolon) and 216 g of styrene are then added with stirring to the polyester at 100° C. The polyester mass crystallises on cooling and is ground to give a free-flowing dry powder which does not cake, even in the event of prolonged storage.

EXAMPLES 2 to 13

The procedure for the following Examples is the same as described for Example 1, except that equivalent quantities of other thermoplasts are used instead of polycarbonate.

In general, powdered additives are used to facilitate homogenisation.

| Example No. | Thermoplast |
|---|---|
| 2 | cellulose acetopropionate whose ester groups consist of about 10 % of acetate and about 90 % of propionate groups |
| 3 | polycarbonate based on tetrabromo bisphenol A |
| 4 | polycarbonate based on tetramethyl bisphenol A |
| 5 | polyamide based on caprolactam (Bayer's Durethan BK) |
| 6 | polyamide based on amino undecane carboxylic acid (Aquitaine-Organico's Rilsan ES) |
| 7 | polyvinyl alcohol (Farbwerke Hoechst's Mowiol N 50 – 98) |
| 8 | polyvinyl acetal (Wacker Chemie's Pioloform BW) |
| 9 | polyvinyl acetal (Wacker Chemie's Pioloform BL 24) |
| 10 | polyethylene (Bayer's Baylen VP 105) |
| 11 | polyethylene (Bayer's Baylon V 18) |
| 12 | polyvinyl chloride (Chemische Werke Huls' Vestolid S) |
| 13 | PVC-copolymer (Chemische Werke Huls' Vilit MG) |

In every case, the products obtained can be processed into free-flowing dry powders which do not cake, even in the event of prolonged storage.

EXAMPLE 14 (COMPARISON)

The procedure is as described in Example 1, except that 54.5 g of polymethacrylate (Rohm's Plexigum H 7) are used instead of the polycarbonate. A tacky, doughy polyester mass is obtained on cooling and cannot be ground. Even when fillers are added, as in the following Examples, the mass remains tacky.

B. Production of free-flowing moulding compositions with fillers and reinforcing agents

EXAMPLE 1a 1000 g of the polyester mass produced in accordance with Example 1 are melted in a kneader at a kneader temperature of 80° C. 20 g of 1,3-bis-(-tert.-butyl-peroxy-isopropyl)-benzene are then added. After 5 minutes, 40 g of zinc stearate and 1000 g of chalk (Durcal 5, a product of Messrs. Omya GmbH Cologne) are kneaded in after 5 minutes and 300 g of glass fibres (13 mm long) after 10 minutes. All the operations are carried out with the kneader closed, to avoid losses of styrene.

After cooling to room temperature, the mass, which is pasty to doughy at 80° C, is comminuted to a grain size of from 1 to 5 mm in a hammer mill. The compositions are compression-moulded at 140° to 160° C into mouldings which have the following properties:

shrinkage according to DIN 53 464: 0.2%
Martens value, standard bar, DIN 53 458: 180° C
flexural strength, standard bar 53 452: 600 ($kp/cm^2$).

There are no signs of any surface marks attributable to differential shrinkage in zones differing in wall thickness.

EXAMPLE 2a to 13a:

The polyester compositions of Examples 2 to 13 are processed in accordance with Example 1a.

| Example No. | Shrinkage according to DIN 53 464 [%] | Martens value according to DIN 53 458 [°C] |
|---|---|---|
| 2a | 0.2 | 180 |
| 3a | 0.35 | 180 |
| 4a | 0.15 | 180 |
| 5a | 0.20 | 180 |
| 6a | 0.19 | 180 |
| 7a | 0.38 | 160 |
| 8a | 0.23 | 180 |
| 9a | 0.24 | 170 |
| 10a | 0.12 | 180 |
| 11a | 0.11 | 180 |
| 12a | 0.22 | 140 |
| 13a | 0.18 | 140 |

The flexural-strength values correspond to those in Example 1a.

EXAMPLE 14a (COMPARISON)

The procedure is as in Examples 1 and 1a, except that the moulding composition does not contain any thermoplasts.

All the other components are used in the same quantities. The mouldings produced with these compositions have the following properties:

shrinkage according to DIN 53 464: 0.6%
Martens value, standard bar, DIN 53 458: 180° C
Flexural strength, standard bar, DIN 53 452: 400 (kp/cm²)

Heavy surface marking was observed in zones of different wall thickness.

EXAMPLE 15a

The polyester composition according to Example 10a was processed in a hydraulic injection extruder into round discs, 100 mm in diameter and having a wall thickness of 7 mm:

barrel temperature: 70°– 75° C
injection pressure: 640 kp/cm²
impact pressure: 80 kp/cm²
follow-up pressure: 240 kp/cm²
mould temperature: 150° C
hardening time: 120 seconds The shrinkage values and mechanical properties of the mouldings correspond to those in Example 10a.

What we claim is:
1. A free-flowing moulding composition comprising
   a. 24–70% by weight of an unsaturated crystalline polyester resin which is the condensation product of fumaric acid and a glycol of the formula

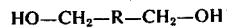

$$HO-CH_2-R-CH_2-OH$$

wherein R is $(CH_2)_z$ wherein z is 1 to 18, or a symmetrical dialkyl derivative of $(CH_2)_z$ whose alkyl substituents are situated on the same carbon atom or cycloalkyl;
   b. 20–75% by weight of styrene and
   c. 1–30% by weight of a cellulose ester of at least one organic acid having 2 to 4 carbon atoms.
2. The free-flowing moulding composition of claim 1 wherein (c) is selected from the group consisting of cellulose acetate, cellulose acetate propionate and cellulose acetate butyrate.
3. The free-flowing moulding composition of claim 1 which additionally contains an effective amount of at least one reinforcing agent selected from the group consisting of jute, sisal, cotton, asbestos and glass fibers.
4. The free-flowing moulding composition of claim 3 wherein said reinforcing agent is glass fibers.
5. The free-flowing moulding composition of claim 1 which contains up to 80% by weight of at least one filler selected from the group consisting of chalk, dolomite, kaolin, talcum, silicates, alumina, barite, quartz and asbestos.

* * * * *